United States Patent
Martch et al.

(10) Patent No.: US 12,114,034 B2
(45) Date of Patent: *Oct. 8, 2024

(54) GRID SYSTEM AND METHOD FOR REMOTE CONTROL

(71) Applicant: DISH Technologies L.L.C., Englewood, CO (US)

(72) Inventors: Henry Gregg Martch, Parker, CO (US); Luke VanDuyn, Conifer, CO (US)

(73) Assignee: DISH Technologies L.L.C., Englewood, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 18/236,683

(22) Filed: Aug. 22, 2023

(65) Prior Publication Data

US 2023/0396828 A1 Dec. 7, 2023

Related U.S. Application Data

(63) Continuation of application No. 18/095,977, filed on Jan. 11, 2023, now Pat. No. 11,770,576, which is a
(Continued)

(51) Int. Cl.
*H04N 21/422* (2011.01)
*G08B 6/00* (2006.01)
(Continued)

(52) U.S. Cl.
CPC ......... *H04N 21/42206* (2013.01); *G08B 6/00* (2013.01); *G08C 17/02* (2013.01);
(Continued)

(58) Field of Classification Search
CPC ....... H04N 21/42206; H04N 21/41265; H04N 21/42213; H04N 21/42218;
(Continued)

(56) References Cited

U.S. PATENT DOCUMENTS 6,288,708 B1 * 9/2001 Stringer ........... H04N 21/42218
345/157
6,559,866 B2 * 5/2003 Kolde .................. H04N 21/485
348/E5.122
(Continued)

FOREIGN PATENT DOCUMENTS

EP 1096453 A2 5/2001
EP 1667485 A1 6/2006
(Continued)

OTHER PUBLICATIONS

International Search Report and Written Opinion for International Application No. PCT/US2014/043408, Sep. 30, 2014, 13 pages.
(Continued)

*Primary Examiner* — David E Choi
(74) *Attorney, Agent, or Firm* — Jeremiah J. Baunach; Frontier IP Law PLLC

(57) ABSTRACT

A remote control system and related method for controlling a video device are presented. The remote control system contains a plurality of buttons arranged in a grid pattern that correspond to user selectable options displayed on a display screen arranged in the same grid pattern. The user selects options on the screen by pressing the corresponding button on the remote control.

5 Claims, 8 Drawing Sheets

Related U.S. Application Data continuation of application No. 17/512,064, filed on Oct. 27, 2021, now Pat. No. 11,582,503, which is a continuation of application No. 13/928,305, filed on Jun. 26, 2013, now Pat. No. 11,190,829.

(51) Int. Cl.
 *G08C 17/02* (2006.01)
 *H04N 21/41* (2011.01)
 *H04N 21/482* (2011.01)
 *G08C 23/04* (2006.01)

(52) U.S. Cl.
 CPC . *H04N 21/41265* (2020.08); *H04N 21/42213* (2013.01); *H04N 21/42218* (2013.01); *H04N 21/42224* (2013.01); *H04N 21/42228* (2013.01); *H04N 21/4821* (2013.01); *G08C 23/04* (2013.01); *G08C 2201/30* (2013.01)

(58) Field of Classification Search
 CPC ....... H04N 21/42224; H04N 21/42228; H04N 21/4821; G08B 6/00; G08C 17/02; G08C 23/04; G08C 2201/30
 See application file for complete search history.

(56) References Cited

U.S. PATENT DOCUMENTS

| | | | | |
|---|---|---|---|---|
| 6,765,557 | B1* | 7/2004 | Segal | H04N 21/42204 345/173 |
| 7,797,713 | B2* | 9/2010 | Dawson | H04N 21/4821 725/38 |
| 8,676,273 | B1* | 3/2014 | Fujisaki | H04M 1/724 455/418 |
| 9,239,837 | B2* | 1/2016 | Chardon | H04N 21/42224 |
| 2004/0041723 | A1* | 3/2004 | Shibamiya | G06F 3/0485 348/E5.103 |
| 2007/0124772 | A1* | 5/2007 | Bennett | H04N 21/485 725/60 |
| 2008/0126975 | A1* | 5/2008 | Vassigh | G06F 3/0219 715/772 |
| 2009/0002218 | A1* | 1/2009 | Rigazio | G08C 17/00 345/173 |
| 2010/0085208 | A1 | 4/2010 | Murakoshi | |
| 2011/0011925 | A1* | 1/2011 | Yoshida | H04N 21/42222 235/375 |
| 2011/0304778 | A1* | 12/2011 | Roberts | G08C 17/02 709/203 |
| 2012/0127375 | A1* | 5/2012 | Geier | A61L 2/232 348/734 |
| 2012/0274547 | A1* | 11/2012 | Raeber | G06F 3/04886 345/156 |
| 2015/0007232 | A1* | 1/2015 | Martch | H04N 21/41265 725/44 |

FOREIGN PATENT DOCUMENTS

| | | |
|---|---|---|
| EP | 2045789 A2 | 4/2009 |
| WO | 2007074417 A2 | 7/2007 |
| WO | 2009038259 A1 | 3/2009 |
| WO | 2010126495 A1 | 11/2010 |

OTHER PUBLICATIONS

International Preliminary Report on Patentability for International Application No. PCT/US2014/043408, Dec. 29, 2015, 9 pages.
Communication pursuant to Article 94(3) EPC for European Patent Application 14738706.2, Mar. 9, 2018, 7 pages.
Foreign Office Action, Canadian Patent No. 2916860, Aug. 8, 2016, 3 pages.

* cited by examiner

GRID SYSTEM AND METHOD FOR REMOTE CONTROL

BACKGROUND

Technical Field

This invention relates to remote control systems and, more particularly, to a remote control system and related user interface for controlling an interactive menu of a video feed using a grid system.

Description of the Related Art

Remote controls are commonly used with a variety of audio and video devices. The devices and paired remote controls have varying levels of complexity and sophistication, often with dozens of functions that are capable of being controlled through the remote control. As the number of functions a device is capable of increases, the number of buttons that a remote control has also increases, leading to complicated and confusing remote control layouts.

One common way to handle the increased functions of a device is by using a directional pad on the remote control to control a user interface that is displayed to the user. The directional pad generally has buttons to move a cursor up, down, left, and right, and an additional button to select the currently highlighted option. Although this method increases the functions that can be controlled through a remote control, it can also be very time consuming for the user, requiring users to press several buttons in a row to choose the function that they wish to execute. Given that the directional pad does not provide alternate functionality beyond item-by-item menu navigation and selection, the directional pad also adds buttons to remote controls that are already filled with buttons. It is not uncommon with today's electronics to see remote controls with 50 or more buttons.

BRIEF SUMMARY

In accordance with the present disclosure, a remote control with buttons arranged in a grid pattern is used to control an associated device. The remote control and associated device both utilize a grid pattern with the same number of columns and rows. Each button of the remote control corresponds to a user selectable option displayed on a user interface of the associated device. The user is able to control the associated device by selecting one of the user selectable options by pressing the corresponding button on the remote control.

According to one embodiment, a video device includes a controller coupled to a display screen, a memory coupled to the controller, a user interface stored on the memory and configured to be output to the display screen, a menu stored on the memory and displayable on the user interface, and a receiver coupled to the controller. The menu contains a variety of user selectable options that are arranged in a grid pattern. These user selectable options correspond to a variety of buttons that are also arranged in a grid pattern on a remote control. Each of the user selectable options has a corresponding button on the remote control, located in the same relative position in the grid pattern. When a user presses one of the buttons in the grid pattern, the corresponding user selectable option is selected.

In a further embodiment, the grid pattern contains at least three rows and at least three columns. In one embodiment, the size of the grid pattern can be changed, depending on the user selectable options being displayed. In another further embodiment, the video device will visually indicate a user selectable option when the corresponding button in the grid pattern has been touched by a user.

In yet another embodiment, the remote control buttons are dual-function. The buttons arranged in the grid pattern are used to highlight and select corresponding user selectable options when the user interface displays the user selectable options in a grid pattern. When the user interface does not display the user selectable options in a grid pattern, the video device transmits a signal to the remote control to enter into a "standard mode" in which the remote control executes different functions for button presses. In standard mode, the buttons arranged in the grid pattern execute a variety of static pre-set functions, such as play, pause, stop, rewind, up, down, left, right, and back.

DETAILED DESCRIPTION

Figure 1:
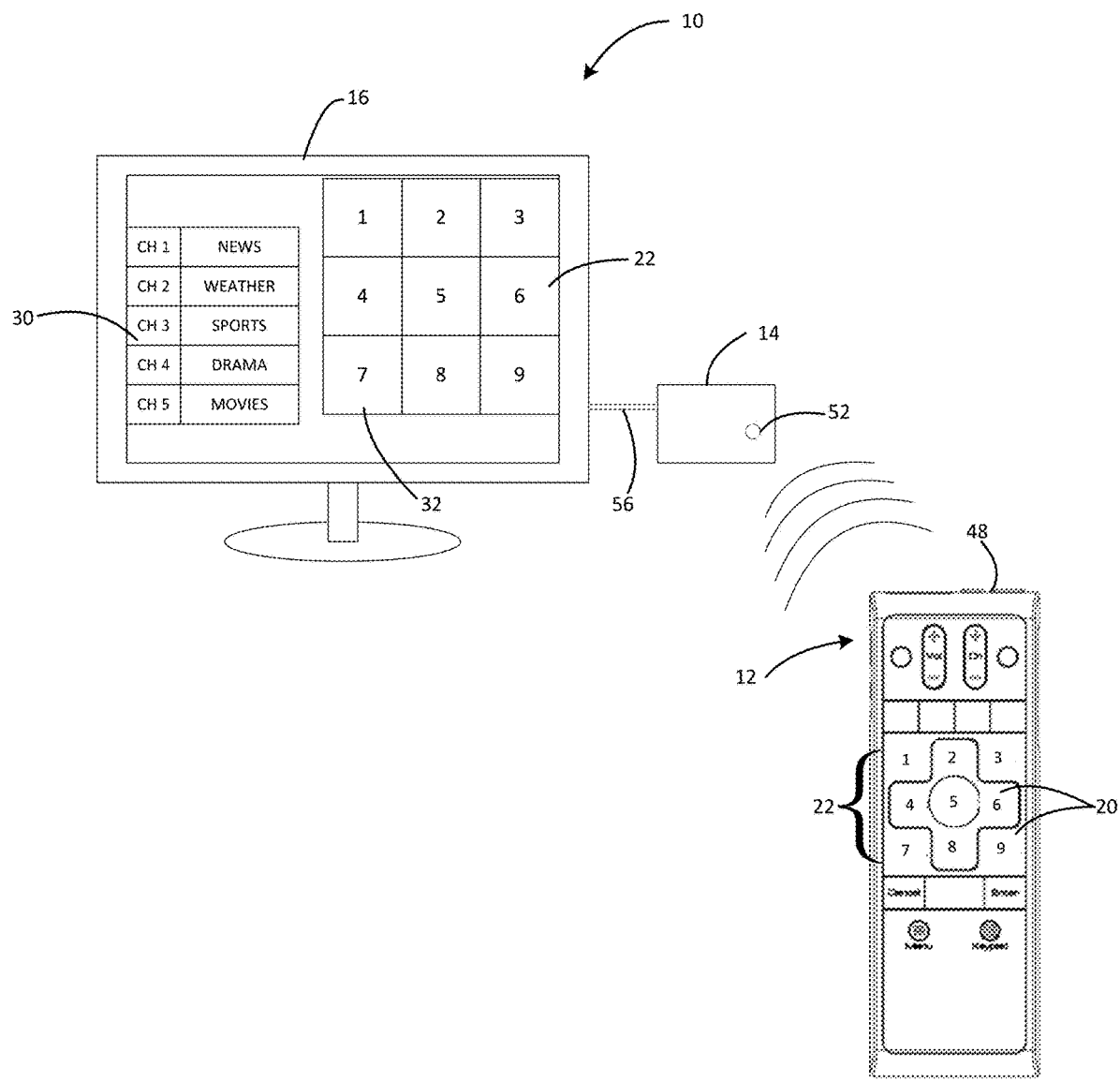
FIG. 1 is a remote control system according to one embodiment of the present disclosure.

FIG. 1 shows a remote control system 10 according to one embodiment of the present disclosure. The remote control system 10 includes a remote control 12 and a video device 14. The video device 14 is generally a set-top box, but may be any device that displays video, such as a DVD player. The remote control 12 is paired with and used to control the video device 14, with functions of the video device being executed when a user presses assorted buttons on the remote control 12. The video device 14 is coupled to a display screen 16 and displays video feed and menus or other visuals. A user views the display screen 16, in part, to see a menu that the user interacts with in order to control the device with the remote control 12.

The remote control 12 has a plurality of buttons 20 located such that a user can view and interact with the buttons 20. At least some of the buttons 20 are arranged in a grid pattern 22 on the remote control 12. The grid pattern 22 can have any number of columns and rows, but preferably has at least three columns, and at least three rows. On the display screen 16 the video device 14 outputs a user interface 30, which provides a number of user selectable options 32 to the user for control of the video device 14. At least some of the user selectable options 32 are also arranged in the same grid pattern 22 as the buttons 20 on the remote control 12. Each one of the user selectable options 32 that is arranged in the grid pattern 22 corresponds to each one of the buttons 20 that are arranged in the grid pattern 22. For example, as shown in FIG. 1, the top, left button "1" corresponds to the top, left selectable option "1," and the middle button "5" corresponds to the middle selectable option "5." The corresponding buttons 20 and user selectable options 32 provide a way to select options and execute functions on the video device with a relatively low number of buttons 20.

Figure 2:
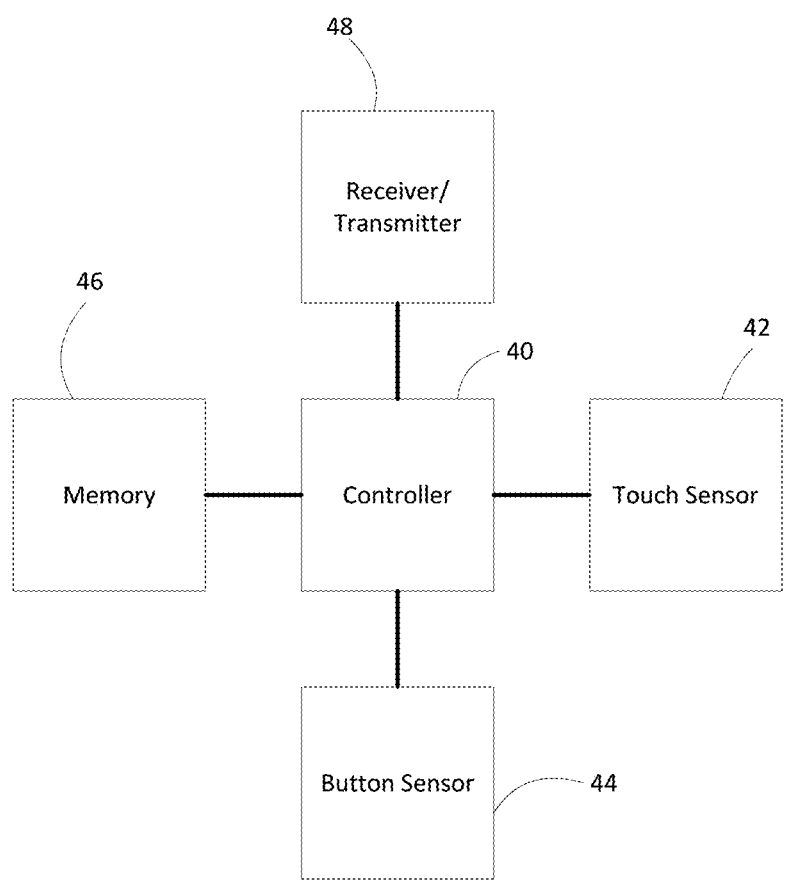
FIG. 2 is a block diagram of a remote control according to one embodiment of the present disclosure.

FIG. 2 shows a block diagram of the remote control 12. The remote control 12 contains a first controller 40, touch sensor 42, button sensor 44, first memory 46 and first receiver/transmitter 48. The first controller 40 is coupled to the touch sensor 42, button sensor 44, memory 46 and receiver/transmitter 48. The first controller 40 can be any microprocessor or other logic controller capable of processing input and output functions.

The touch sensor 42 is a sensor capable of detecting an object that is touching or in close proximity to the sensor. The sensor may be any common touch sensor, such as capacitive touch sensors, inductive touch sensors, resistive touch sensors or any other suitable sensor. The object that is touching the sensor is generally a finger, but may also be a stylus or any other object used for touch functionality. The touch sensor 42 is located under the buttons 20, particularly the buttons 20 that are arranged in the grid pattern 22. The touch sensor senses the position of a finger or other object on the buttons 20 that are arranged in the grid pattern 22 to determine which button is being touched. The touch sensor is coupled to the first controller 40, which processes the output of the touch sensor 42.

The button sensor 44 is generally a pressure sensitive sensor located under the buttons 20. The button sensor 44 detects when an object, preferably a finger, presses a button. The button sensor 44 is used to detect when a user desires to select one of the user selectable options 32 using the grid pattern 22, or is used to execute a variety of static functions that may be assigned to assorted buttons 20. Upon pushing the button, the button sensor 44 will output a signal to the controller 40, which processes and sends the signal to the video device.

In alternative embodiments, the button sensor could also be the touch sensor 42. In such an embodiment, the button sensor 44 would register touches that are different from those that the touch sensor 42 is configured to register. For example, the button sensor 44 could register a finger double-tapping the touch sensor 42, or any other specific touch motion.

The first memory 46 is coupled to the first controller 40 and used to store instructions, data, and other information. The first memory 46 is generally any non-volatile memory, such as ROM or Flash memory, but may include any memory device, such as DRAM or SRAM. The first memory stores instructions for the first controller 40, as well as other information and data related to the remote control 12 or video device 14.

The receiver/transmitter 48 is coupled to the first controller 40 and configured to send and receive wireless signals. The wireless signals are generally radio signals, such as RF4CE or Bluetooth, but can also be infrared signals or any other wireless signal. In a preferred embodiment, the remote control 12 and video device 14 are in two-way communication with each other. The remote control 12 sends signals to the video device primarily to instruct the video device to execute the assorted functions associated with the buttons 20 located on the remote control, or any other instructions or information that the video device needs from the remote control. The video device 14 also sends signals to the remote control 12. These signals are received by the receiver 48, and are configured to instruct the remote control 12 of the state of the video device, or to provide other information to the remote control such as software updates. In an alternative embodiment, the remote control 12 may contain only a transmitter, and is not configured to receive wireless signals.

Figure 3:
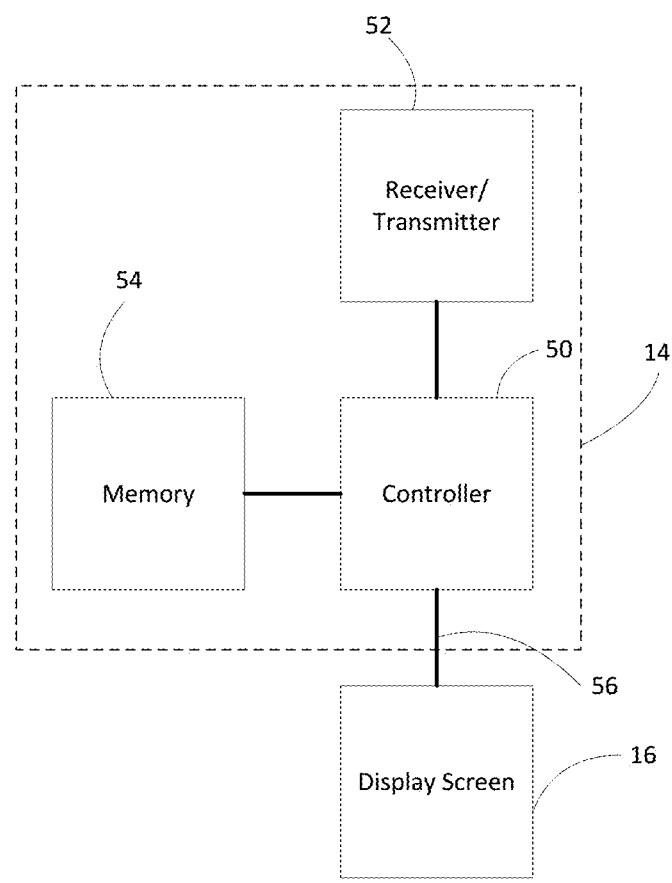
FIG. 3 is a block diagram of a video device according to one embodiment of the present disclosure.

FIG. 3 shows a block diagram of the video device 14. The video device contains a second controller 50, second transmitter/receiver 52, second memory 54 and output 56. The second controller 50 is coupled to the second memory, second transmitter/receiver and output of the video device, and acts a processor for inputs and outputs of the video device. The second controller 50 is preferably a microprocessor, but can be any device capable of logic functions and processing inputs and outputs.

The second transmitter/receiver 52 is configured to receive and transmit signals with the first transmitter 48 of the remote control 12. The second receiver/transmitter 52 performs many of the same functions described above with respect to the first receiver/transmitter 48 of the remote control 12. The receiver 52 may also be configured to receive radio signals over Wi-Fi, or receive a wired internet, satellite or cable connection in order to receive video information from a remote server.

The second memory 54 is coupled to the second controller 50, and configured to store instructions and other data. The memory 54 may be any volatile or non-volatile memory, such as Flash, ROM or RAM. In some embodiments, the memory 54 may consist of multiple types of memory, such as volatile memory for storing temporary instructions or data, and non-volatile memory for storing permanent instructions or data.

The output 56 is coupled to the controller 50, and configured to connect to the display screen 16. The output 56 is an analog or digital video, audio or audio/video output, such as HDMI, DVI, composite video, VGA or component video. The output 56 is used to connect the video device 14 to the display screen 16 in order to display information or entertainment the user. The user interface 30, and related grid pattern 22 and user selectable options 32, are viewed by the user via the output 56 and display screen 16.

Figure 4:
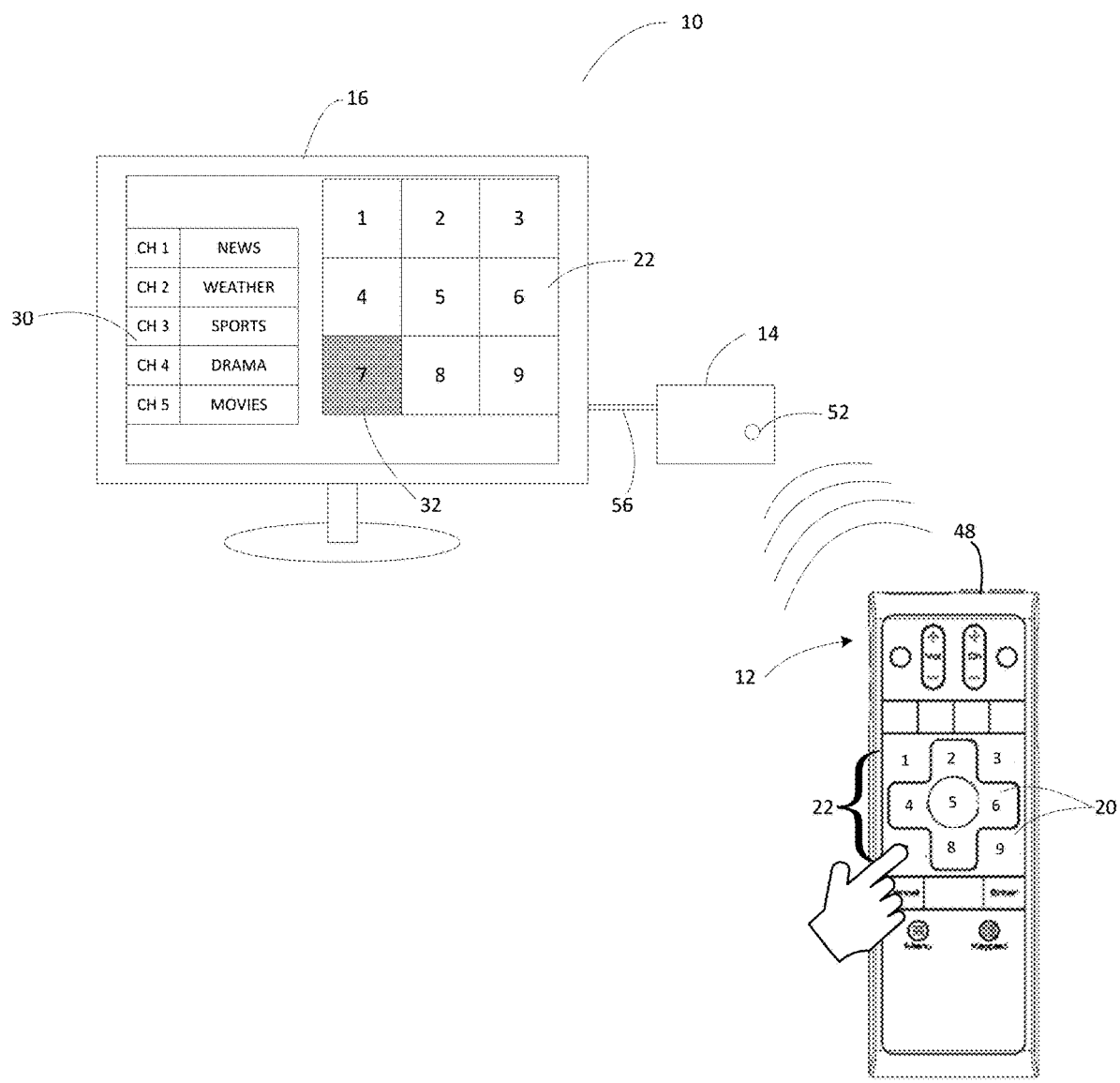
FIG. 4 is a remote control system with a grid pattern according to one embodiment of the present disclosure.
Figure 5:
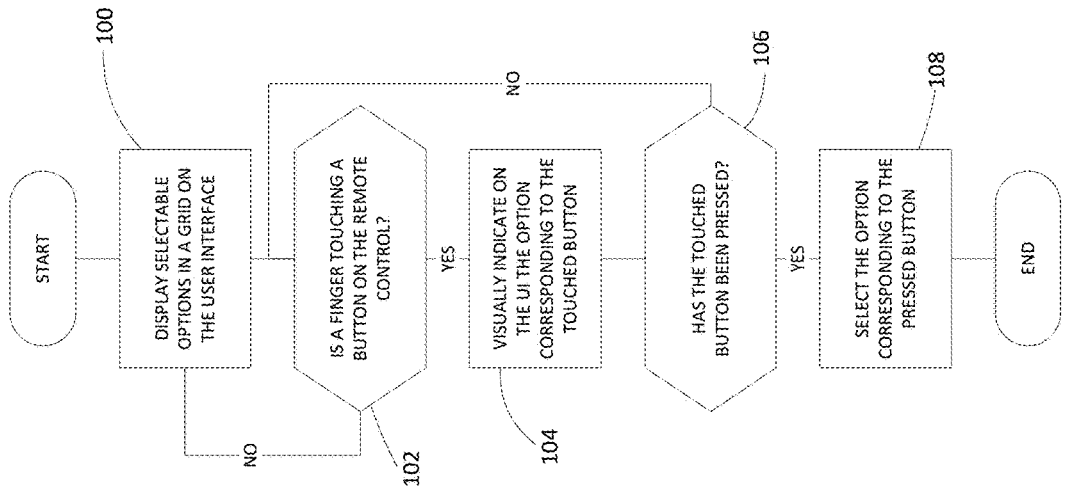
FIG. 5 is a flowchart of the remote control system of FIG. 4.
Figure 6:
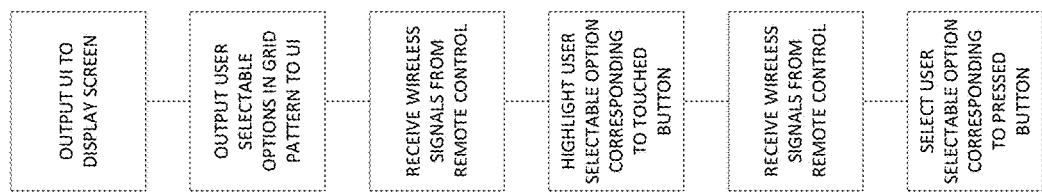
FIG. 6 is a flowchart of the operation of a video device according to one embodiment of the present disclosure.

FIGS. 4-6 show the remote control system 10 utilizing the grid pattern 22. The user first enters into the user interface on the video device 14. This can be performed automatically upon start-up of the video device 14, or may be entered via instruction by the remote control 12. Once the user interface 30 has been entered, the user views the user interface 30 on the display screen 16. The user interface 30 will have a variety of functions, at least some of which will utilize the grid pattern 22. When a user desires to perform a function or functions using the grid pattern 22, the video device 14 will display the grid pattern 22 on the display screen 16.

As shown in FIGS. 5 and 6, the remote control 12 and associated touch sensor 42 will first detect a finger or other object touching the buttons 20 at 102. When the touch sensor 42 detects a finger touching a specific button 20, it will transmit this data to the video device 14 through the first transmitter 48. Upon receiving the signal from the remote control 12, the video device 14 will highlight the corresponding user selectable option 32 on the user interface at 104. As the user moves their finger around the remote control 12 to different buttons 20, the video device 14 visually indicates the user selectable options 32 that correspond to the button currently being touched at 104. The visual indication may be changing the color of the use selectable option 32, placing a border around the option 32, enlarging the option 32 or any other suitable means to indicate the option. In this way, the user can move their finger around the buttons that are arranged in the grid pattern 22 and view which button 20 they are currently touching by showing the corresponding user selectable option 32 on the display screen 16. This allows users to use the remote control 12 in low-light environments, common for television or movie watching. In addition to viewing the corresponding user selectable option 32 highlight on the screen, the remote control 12 may provide tactile feedback to the user in order to distinguish between the different buttons 20 in the grid pattern 22. For example, the buttons may be separated by a raised or lowered channel, allowing a user to feel the border between different buttons so that they may feel when they have moved their finger to a new button 20. Alternatively, the buttons may provide a brief vibration when the touch sensor 42 detects that the user has moved their finger from one button to another.

Once a user has touched the button 20 that corresponds to the user selectable option 32 that they wish to select, they will select that option by pressing the button 20. The button sensor 44 will detect when a button has been pressed, and transmit the information to the video device through the transmitter 48 at 106. When the video device receives the signal indicating that button has been pressed, it will select the user selectable option 32 corresponding to the button being pressed at 108. If a button 20 that is not a part of the grid pattern 22 is pressed, or if the grid pattern 22 is not currently in use, the button's pre-set function, such as power, volume, channel or other functions, will be transmitted to the video device 14.

Figure 7:
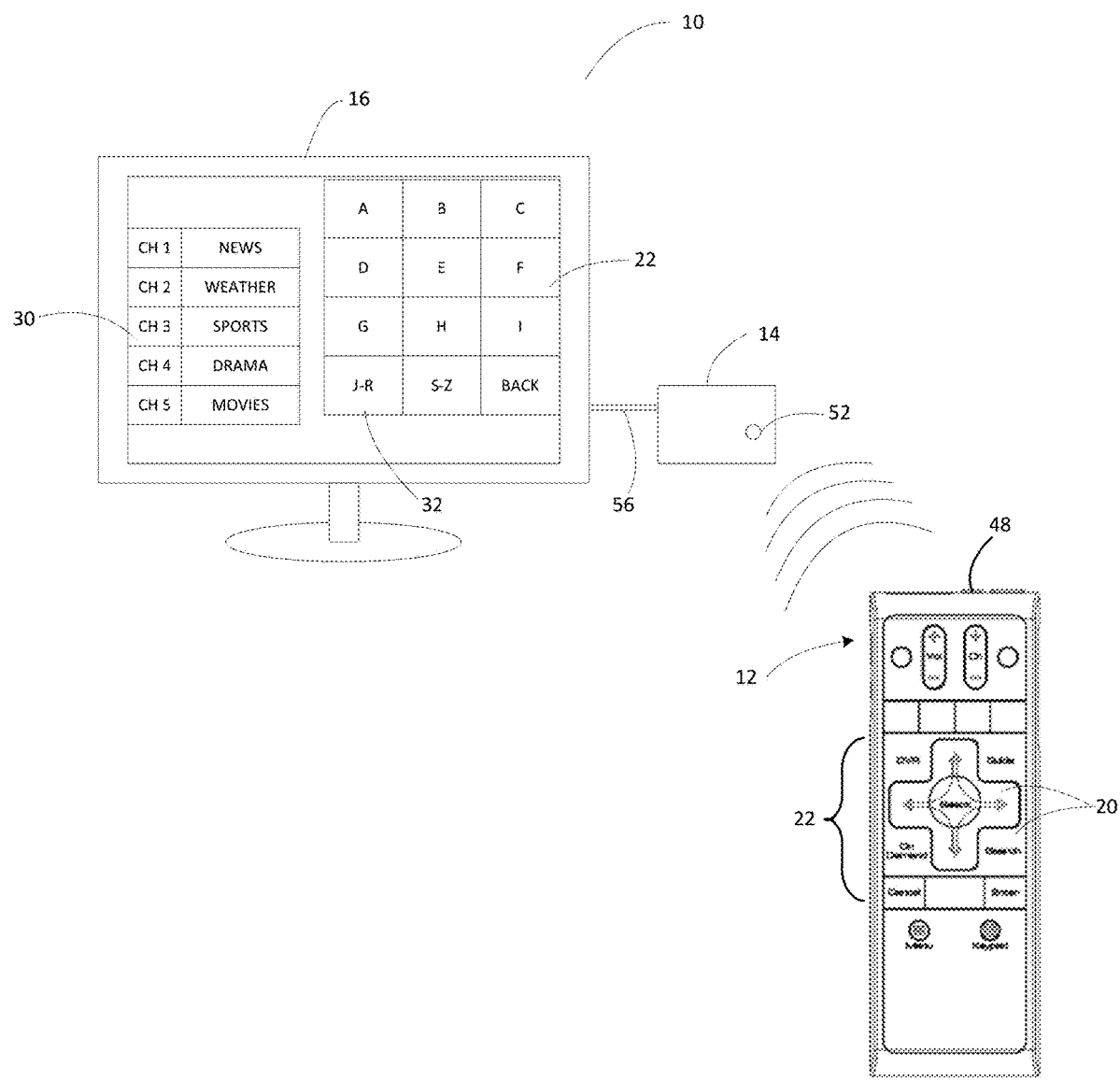
FIG. 7 is a remote control system having a dual-function remote control according to one embodiment of the present disclosure.
Figure 8:
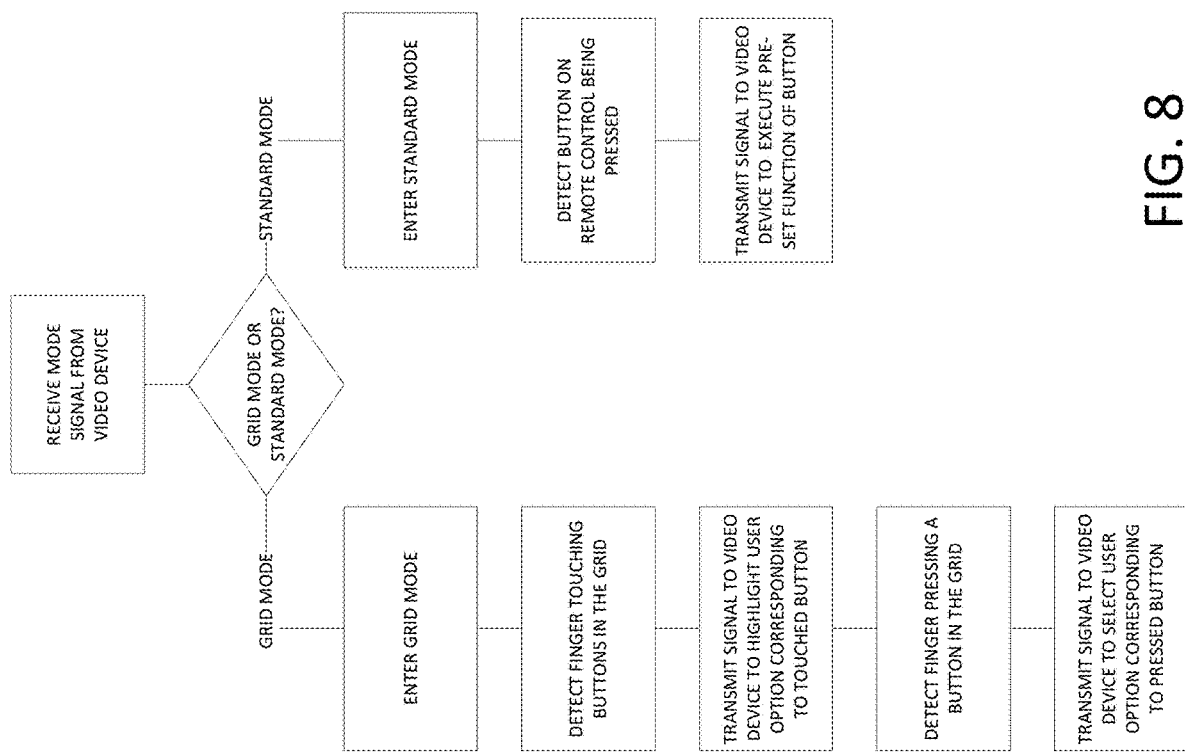
FIG. 8 is a flowchart of the dial-function remote control of FIG. 7 according to one embodiment of the present disclosure.

FIGS. 7-8 show an embodiment of the remote control system 10 wherein the remote control 12 is a dual-function device. The remote control 12 uses buttons 20, particularly the buttons arranged in the grid pattern 22, as dual-function buttons. Each button arranged in the grid pattern 22 has a pre-set function, as well as functioning as the corresponding button to a user selectable option 32. The remote control 12 receives signals from the video device 14 that instruct the remote control which of the dual-function modes it will enter. When the video device is displaying a grid pattern 22 on the user interface, it will instruct the remote control 12 to enter a "grid mode," and when the video device is not displaying the grid pattern 22, it will instruct the remote control 12 to enter a "standard mode."

The buttons 20 that are arranged in the grid pattern 22 also have at least one pre-set function each that is performed when in "standard mode." For example, a button may have the function of DVR, Guide, Search, Select, or a directional function such as up, down, left or right. In a preferred embodiment, these functions will be visually labeled on the remote control 12, as seen in FIG. 7. When the video device 14 is in "standard mode" these pre-set, labeled functions will execute upon a user pressing one of the buttons 20. When functioning in "standard mode," the remote control 12 will function in a similar fashion to a standard remote control, wherein each button has a pre-set function.

When the video device 14 displays the user selectable options 32 in a grid pattern on the display screen 16, it sends a signal to the remote control 12 to enter into a "grid mode." The grid mode changes the functionality of the buttons 20 arranged in the grid pattern 22 from the pre-set functions of the "standard mode" to functioning as corresponding buttons to the user selectable options 32. While in grid mode, each of the buttons of the grid pattern 22 act to select the corresponding user selectable option 32 of the user interface 30. For example, with respect to FIG. 7, when in grid mode, a user touching the "guide" button will highlight the user selectable option "C" which will type the letter C into a search query or other text input.

In an alternative embodiment, the user may select between "grid mode" and "standard mode" even when the grid pattern 22 is being displayed on the user interface 30. Many users will be used to the standard functionality of a remote control, and therefore will desire to use the "standard mode" to navigate through the user selectable options 32 using a directional pad.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A remote control, comprising:
   at least one processor;
   a plurality of buttons arranged in a grid pattern on the remote control that each have functionality that changes from being in a standard mode to being in a grid mode in response to a first signal from a video device and changes from being in the grid mode to being in the standard mode in response to a second signal from the video device, each of the plurality of buttons arranged in the grid pattern having at least one pre-set function of the standard mode labeled on the remote control that is performed only when in the standard mode and each of the plurality of buttons arranged in the grid pattern instead act, only when in the grid mode, to select a corresponding user selectable option displayed in a grid pattern of a plurality of user selectable options on a user interface of the video device; and
   at least one memory coupled to the at least one processor, the at least one memory having computer-executable instructions stored thereon that, when executed by the at least one processor, cause operations to be performed including:
   the remote control changing from the standard mode to the grid mode, wherein the remote control is not in the standard mode and the grid mode at a same time, the standard mode and grid mode are not operational on the remote control at the same time, and the grid mode and standard mode are independent of each other, wherein changing from the standard mode to the grid mode changes the functionality of the plurality buttons arranged in the grid pattern from the labeled pre-set functions of the standard mode to functioning as corresponding buttons to the plurality of user selectable options on the user interface of the video device;
   the remote control changing from the grid mode to the standard mode in response to the receiving, from the video device, the second signal to enter into the grid mode, wherein changing from the grid mode to the standard mode changes the functionality of the plurality buttons arranged in the grid pattern to the labeled pre-set functions of the standard mode from the plurality of user selectable options that were previously displayed on the user interface of the video device.

2. The remote control of claim 1, wherein the operations further comprise providing tactile feedback when a user moves their finger from one of the buttons to another of the buttons.

3. The remote control of claim 2, wherein the tactile feedback is a physical structure positioned between each of the plurality of buttons arranged in the grid pattern.

4. The remote control of claim 1, wherein, when in grid mode, a user touching a "guide" button from the plurality of buttons arranged in a grid pattern on the remote control, and that is labeled on the remote control with a pre-set "guide" function of the standard mode, highlights a corresponding user selectable option of a letter displayed in the grid pattern of the plurality of user selectable options on the user interface of the video device to type the letter into a search query or other text input.

5. The remote control of claim 1, wherein the operations further comprise:
    receiving input indicative of a user selection between the remote control being in the grid mode and standard mode; and
    changing the functionality of the plurality buttons arranged in the grid pattern between the labeled pre-set functions of the standard mode to functioning as corresponding buttons and the plurality of user selectable options on the user interface of the video device in response to receiving the input indicative of the user selection between the remote control being in the grid mode and the standard mode.

\* \* \* \* \*